C. MESSENGER.

Broom Head.

No. 60,221.

Patented Dec. 4, 1866.

Witnesses:

Inventor:
Charles Messenger

United States Patent Office.

IMPROVED BROOM HEAD.

CHARLES MESSENGER, OF CHICAGO, ILLINOIS.

Letters Patent No. 60,221, dated December 4, 1866.

SPECIFICATION.

TO ALL WHOM IT MAY CONCERN:

Be it known that I, C. MESSENGER, of Chicago, in the county of Cook, and State of Illinois, have invented certain new and useful improvements in Broom Heads; and I do hereby declare that the following is a full and complete description thereof, reference being had to the accompanying drawings, making a part of this specification, in which—

Figure 3:
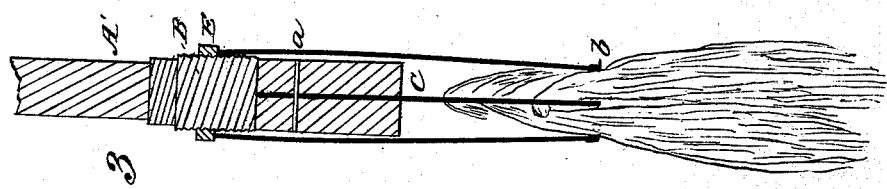
Figure 2:
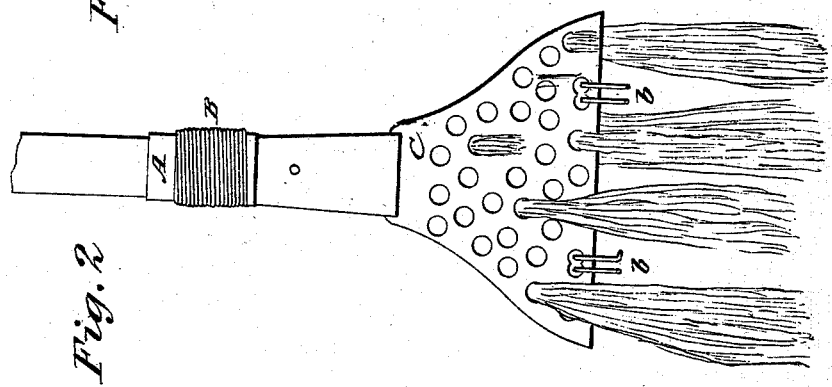
Figure 1:
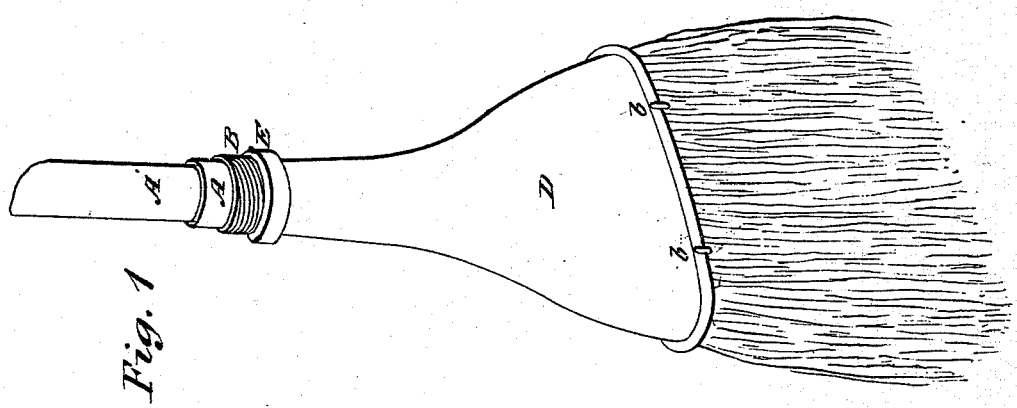

Figure 1 is a perspective view of the broom head.
Figure 2 is a view of the head with the cap removed.
Figure 3 is a longitudinal vertical section.
Like letters of reference refer to like parts in the different views.

A is a socket or ferrule which encircles the handle, A', and is firmly secured to it; on the outside of this socket is a thread, B. C, fig. 2, is a metallic plate, which is perforated for the purpose of holding the corn; this plate is fastened to the handle, as shown at a, fig. 3. D is a cap or case which fits down over the plate and socket, and is kept in place by the nut E. b b are hooks for the purpose hereafter shown.

The manner in which the broom is constructed is as follows: The stems of the corn are placed through the holes in the metallic plate, a similar quantity on each side, until there is enough to make the broom as large as desired; the holes may be more or less in number, according to the size of the broom; the stems are then bent downward, as shown in figs. 2 and 3, making it impossible for the corn to slip out of place; the cap, D, is then drawn down over the handle and socket, and forced over the stems in the metallic plate, by screwing down the nut, E, over the thread of the socket until the cap is pushed down over the stems and corn as far as possible; the hooks, b b, which are fastened to the bottom of the metallic plate, are then pushed through the brush and hooked to the lower edge of the cap, there being two or more on each side, thus holding it securely. When the brush is worn out, new corn may be placed therein by unscrewing the nut, E, taking off the cap, and replacing the corn in the metallic plate with new, in the manner above described. Thus, a new broom may be had in a few minutes, with no expense and very little trouble, as it is constructed easily and quickly. There may be one or more metallic plates, as desired, and the broom can be made large or small with equal facility and readiness.

What I claim as my invention, and desire to secure by Letters Patent, is—

The socket A, nut E, and handle A', perforated plate C, arranged in combination with the hooks b and case D, for the purpose and in the manner as specified.

CHARLES MESSENGER.

Witnesses:
WM. ZSCHOCKE,
JULIUS KATZ.